United States Patent [19]

Durazzani et al.

[11] Patent Number: 5,433,091
[45] Date of Patent: Jul. 18, 1995

[54] PLASTIC DRUM FOR CLOTHES WASHING MACHINES

[76] Inventors: Piero Durazzani, Via Lazio 7, 33080 Porcia, Pordenone; Giorgio Sacchiero, Via Repubblica 23, 25024 Leno, Brescia, both of Italy

[21] Appl. No.: 144,200

[22] Filed: Oct. 27, 1993

[30] Foreign Application Priority Data

Oct. 29, 1992 [IT] Italy .............................. PN92A0082

[51] Int. Cl.6 ............................................. D06F 21/02
[52] U.S. Cl. ...................................... 68/140; 34/602; 68/142
[58] Field of Search ........................... 68/24, 139-146, 68/23.2; 34/596, 602

[56] References Cited

U.S. PATENT DOCUMENTS

| | | | |
|---|---|---|---|
| 2,984,094 | 5/1961 | Belaieff | 68/23.2 |
| 4,423,607 | 1/1984 | Munini | 68/144 X |
| 4,484,461 | 11/1984 | Parks et al. | 68/142 |
| 5,115,651 | 5/1992 | Nukaga et al. | 68/24 X |

FOREIGN PATENT DOCUMENTS

| | | | |
|---|---|---|---|
| 2591244 | 6/1987 | France | 68/142 |
| 634489 | 2/1962 | Italy | 68/140 |
| 1388731 | 3/1975 | United Kingdom | 68/142 |
| 1488809 | 10/1977 | United Kingdom | 68/139 |
| 2121834 | 1/1984 | United Kingdom | 68/140 |

*Primary Examiner*—Philip R. Coe

[57] ABSTRACT

Clothes washing machine, in particular of the household type, comprising a tub containing a perforated drum (1) which is formed by an outer cylindrical mantle, a rear plate and an open front wall and is supported by a spider journal, wherein the drum is molded as a single piece by a blow-molding process in which the outer cylindrical mantle of the drum is formed so as to create a plurality of trapezoidally shaped concave ribs (4). The drum has a peripheral rim (6) projecting from the outer portion, in particular from the front outer portion of the cylindrical mantle near the opening, so as to strengthen the structure and enable it to stand the highest expected load stresses. To the peripheral rim, appropriate extensions of the arms of the spider journal are fastened.

13 Claims, 3 Drawing Sheets

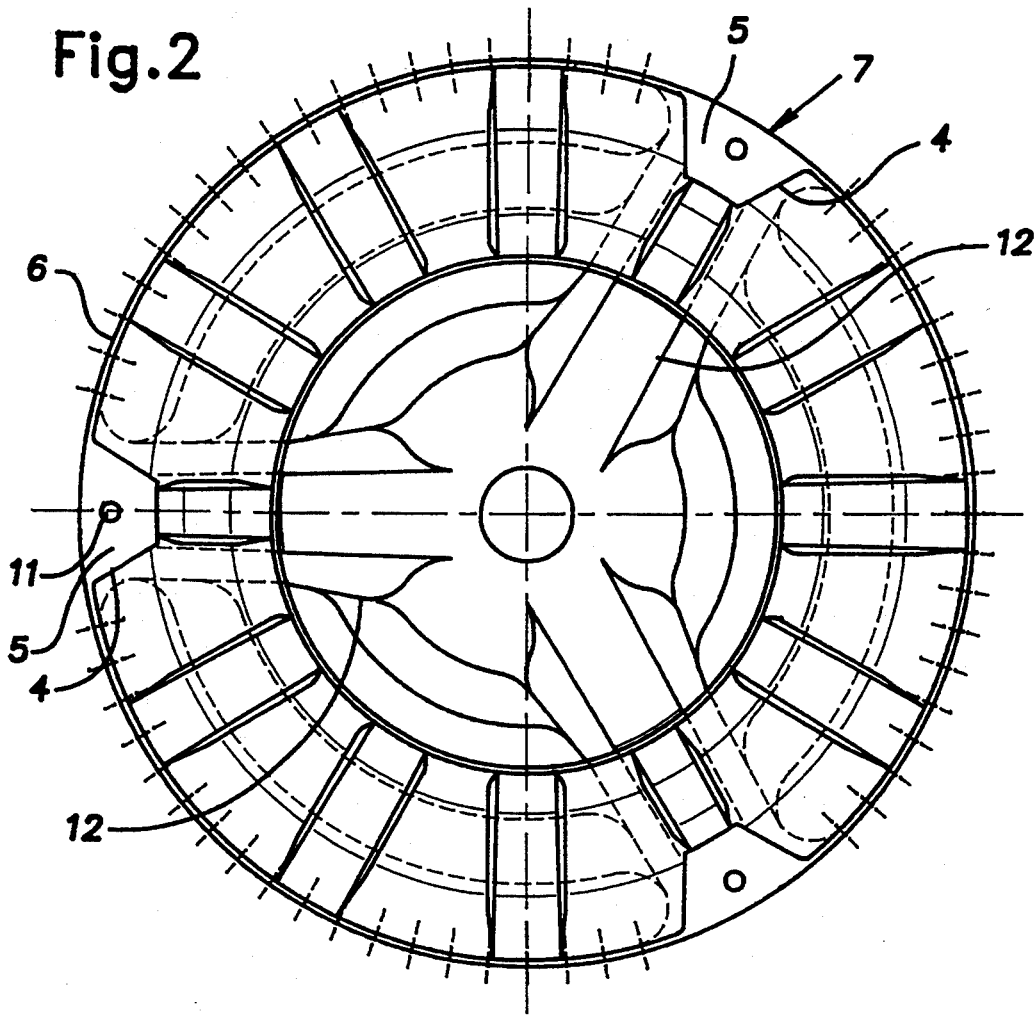
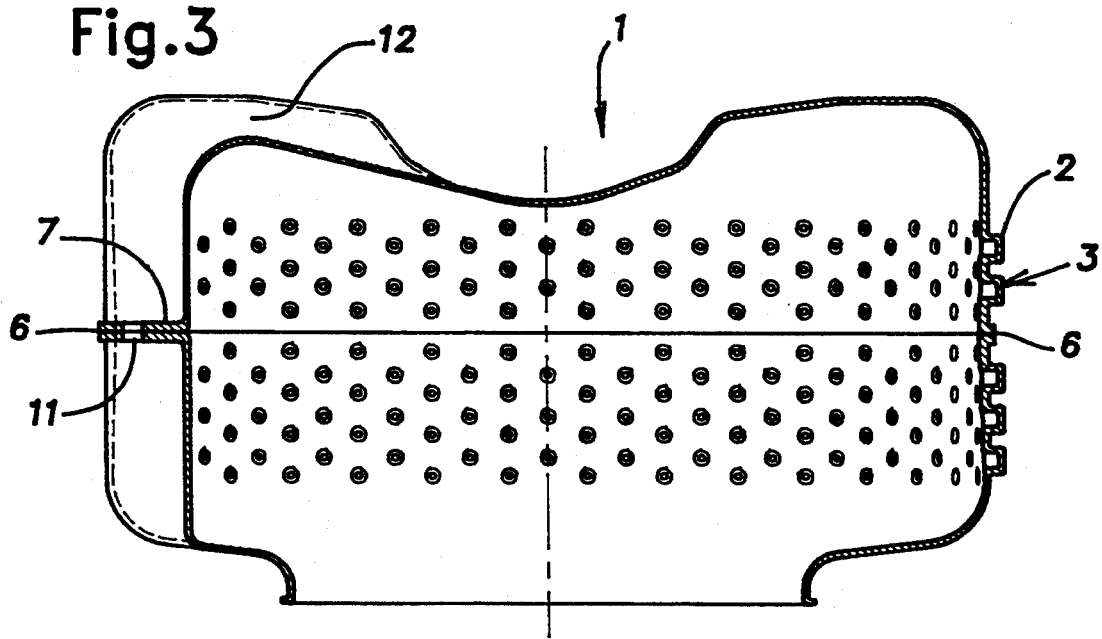

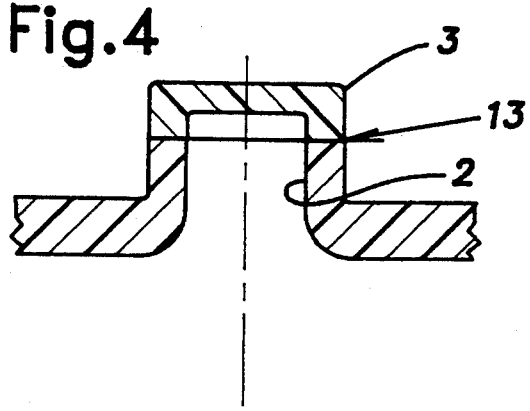
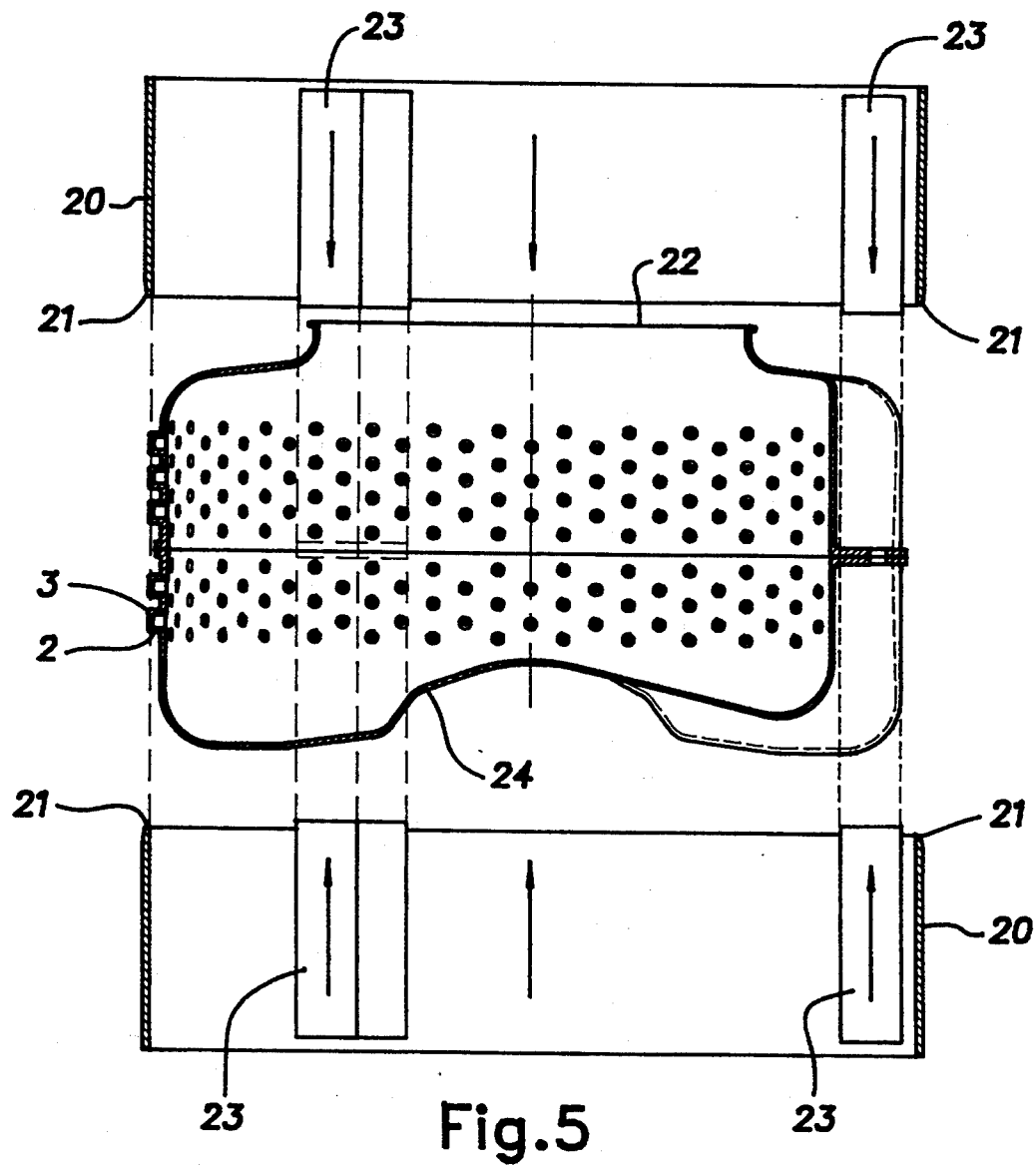

PLASTIC DRUM FOR CLOTHES WASHING MACHINES

BACKGROUND OF THE INVENTION

This invention relates to an improved plastic drum for clothes washing appliances, in particular washing machines of the household type.

Washing machines, in particular of the front-loading type, are known in which the clothes to be washed, or the washload, are contained in appropriate perforated, i.e. non-watertight, containers that are generally termed as "drums". The drums are manufactured according to various methods and consist essentially of a rigid structure formed by a front wall, a back plate and an outer cylindrical mantle.

The drums are installed in an outer watertight container, generally termed a "tub" containing the washing liquid, and are suspended inside the tub by means of a mounting element with a radial structure, named a spider journal. The spider journal supports the drum through a supporting shaft that doubles as a driving shaft adapted to convey the rotary motion to the drum. The drum is routed through an appropriate sealed aperture provided in the tub.

Furthermore, oil the inner side of the afore cited outer cylindrical mantle of the drum, a number of vane-like elements, named "ribs" are usually provided in order to promote agitation of the washload in the drum.

Such drums are essentially fabricated using two types of manufacturing methods and related materials. The most traditional method consists of a cylindrical metal structure in which the two walls and the cylindrical mantle are made using stainless sheet-steel and appropriate fabrication processes therefor.

While quite reliable, this type of drum involves considerable fabrication and assembly costs since each one of its component parts has to be fabricated separately, with the use of respective dies and equipment, and finally assembled.

A second, more recent type of drum consists of a structure made of plastic material obtained by separately molding two portions of the drum and then joining these two portions together with the so-called "specular" welding technique, or a similar technique. The structure can also be obtained, as disclosed in the European patent application no. 472 840 A2, with a method that comprises a first phase in which, by using an appropriate mold capable of molding not only the structure of the drum, but also the related spider journal and ribs at the same time. The rigid structure of the drum is obtained by injection molding the plastic material into the cavity of the mold in such an amount as to partially fill the portions of the mold cavities defined between a stationary plate and a moving plate of the mold, while the front wall of the drum is molded separately and assembled later on.

In the described method, before the plastic material is injected into the appropriate mold cavities, the drum supporting shaft is introduced on a corresponding projection in the afore cited mold plate.

Such a method has the advantage of a considerable simplification of the manufacturing process and a remarkable saving in material usage.

However, a still incomplete drum, i.e. a drum that shall be further joined to its front wall through an additional assembly operation, is obtained with this method. Furthermore, the drum that is obtained in this way proves to be quite a delicate construction in practice, since the gravity and rotary stresses imparted by the driving shaft are transmitted to the drum structure through a spider journal of plastic that is shrink-fitted directly on the shaft. Due to the notorious fact that plastics are not very tough materials and therefore tend to become loosened quite easily, the plastic spider journal proves generally to be rather fragile and suited only to light-duty applications.

A rotating drum of plastic material for clothes washing machines is also known, as disclosed in the Italian patent application no. 6993/B/85, to be provided on one side with a coaxial supporting and driving shaft supported on the back side, with further supporting means of the rolling bearing type that are mounted between the drum and the tub.

Such an embodiment appears, however, to be quite difficult to be implemented in practice due to the fact that said interposed rolling support means, typically bearings, have the effect of acting as brakes and considerably retarding the rotating motion of the drum at its high spinning speeds. Furthermore, the bearing means are quite likely to become damaged since they are almost constantly submerged in the washing liquid. Thus, their cost and assembly would inevitably put an additional heavy burden on the production economics while at the same time impairing the overall reliability of the tub/drum assembly.

A rotating drum of plastic material for top-loading clothes washing machines is also known, as disclosed in the Italian patent application no. 7048/B/85, to consist of a perforated cylindrical mantle, to which two corresponding head flanges are applied on both sides. The flanges are fastened to the mantle with techniques and methods that are well-known in the art.

Even such an approach has clear drawbacks due to the need of setting up three different molds, producing the three component parts of the drum separately. Then assembling them by means of such mechanical fasteners as rivets, bolts and/or tie-rods or screw-stays, which adds a further operation that makes the production of the drum more complicated and its costs significantly higher.

SUMMARY OF THE INVENTION

It would therefore be desirable, and it is a purpose of the present invention, to use for fabricating a plastic drum for clothes washing machines, in particular washing machines of the household type, a process that is able to do away with the above cited manufacturing complications, drawbacks and additional costs. While also being capable, through the use of available techniques, of accomplishing in a fully reliable and effective way its task of containing and agitating the washload without undergoing constructional complications or constraints.

BRIEF DESCRIPTION OF THE DRAWINGS

The invention will be further described below by way of non-limiting example with reference to the accompanying drawings, in which:

FIG. 2 is a cross-section of said drum according to the present invention, with respect to its axis;

FIG. 3 is a second sectional view taken on a plane passing across the axis of the drum and on a particular point of the cylindrical mantle;

FIG. 4 is an enlarged detail of a section which is orthogonal to the axis of the drum and passing across one of its outer perforations;

FIG. 5 is a schematical view of a phase of the process according to the present invention.

DETAILED DESCRIPTION OF THE INVENTION

Figure 1:
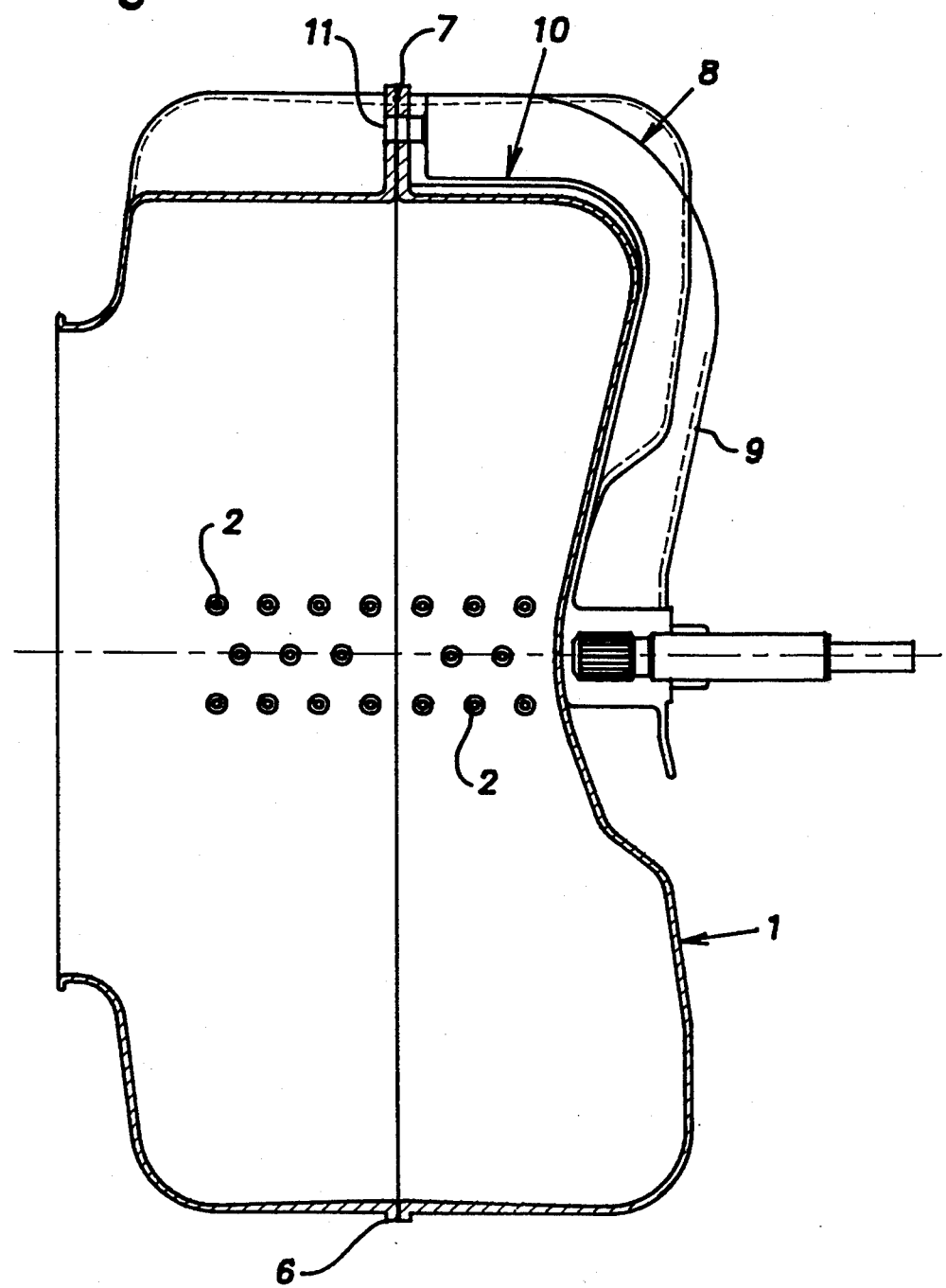
FIG. 1 is a sectional view taken along the axis of the drum according to the present invention.

With reference to the above listed Figures, the process according to the present invention consists of two phases, of which the first phase is to make a complete drum 1, entirely of plastic and in a single piece, with the blow molding technique.

In order to obtain perforations, provided for the passage of the washing liquid therethrough, on the cylindrical mantle of the drum, a plurality of blind holes 2 are embossed during the same blow molding phase. The blind holes 2 project outward and are closed by respective caps 3, as best shown in FIGS. 3 and 4.

After having formed the drum assembly with the blow molding technique, the second phase of the process is started in which the caps 3 are cut off by means of a surface spot-facing operation, as shown schematically in a FIG. 5. Such an operation consists of cutting away the caps 3 by means of one, or preferably two, cylindrical blades 20 having a radius that is equal to the radius from the axis of the drum to the junction 13 of the caps 3. The blades 20 are arranged so that their cutting edge 21 is able to cut into the desired cutting zone with a motion that is parallel to the axis of the drum.

The cylindrical blades 20 can consist of two substantially similar blades that are arranged on opposite sides of the drum, i.e. one facing the front opening 22 and the other one facing the back plate 24 of the drum.

When the blades and the drum are arranged in a correct relative position, the second phase of the process is actually started by clamping the drum to lock it in its final position so as to prevent it from moving during the cutting operation. Any movement during the cutting operation would give rise to undesired burrs and distortions.

Such a clamping of the drum may be performed in a variety of ways. However, a preferred way provides for the drum to be clamped by first allowing a plurality of flange-holding cylinders 23 to tighten with a symmetrical movement against flanges 7 that are arranged on the cylindrical mantle of the drum and which will be described more closely below. The flange-holding cylinders 23 are associated to both blades and are capable of moving coaxially with the blades.

Having locked the drum in position, the cutting or spot-facing operation is performed by allowing the blades 20 to symmetrically slide forward along their axis, which coincides with the axis of the drum, so that each cutting edge 21 will progressively dissect and remove all of the caps 3 which project outward.

It has been found that this process enables the caps to be cut off without giving rise to burrs or similar cutting imperfections that may prove damaging to the clothes to be contained in the drum. This is due to both the depth of the perforations and the fact that the cutting action takes place exactly at the junction 13 of the caps 3, as is best shown in FIG. 4.

In view of making most efficient use of the blow molding process, the required ribs 4 are molded integrally with the drum by forming appropriate trapezoidally shaped depressions 5 on the cylindrical surface of the drum, as shown in FIG. 2.

Such a particular shaping of the ribs gives two distinct advantages at the same time. The first advantage results from the fact that the depressions formed on the outer cylindrical surface of the drum extend further through corresponding recesses 12 projecting radially from the center of the back plate of the drum toward the respective depressions 5 on the cylindrical surface. The recesses 12, as seen from the inside of the drum, appear to be respective prominences protruding from the rear plate and continuing along the profile of the corresponding ribs.

The advantage derives from the fact that during the rotation of the drum, the washing liquid, instead of slipping off the sides of traditionally shaped ribs, finds its way practically obstructed by the recesses 12 and, as a consequence, is lifted up to a certain height before being allowed to fall back into the bottom portion of the drum. A continuous mill-wheel effect is obtained, producing a cascade of washing liquid down onto the bottom of the drum, and against the clothes contained therein, and thereby improving the washing effectiveness.

The second of the two above cited advantages derives from the fact that the drum is provided with a peripheral rim 6 projecting from the outer portion, in particular from the front outer portion of the cylindrical mantle near the front loading opening. The rim serves to strengthen the structure and enable it to appropriately stand the highest dynamic and load stresses that may be encountered under operating conditions.

The peripheral rim 6 extends inwardly by taking the form of a substantially trapezoidally shaped, plane flange 7 when it runs over and into the depressions 5.

By appropriately taking advantage of this circumstance, a spider journal 8 is created, as shown in FIG. 1. The radial arms 9, which embrace the drum with extensions 10 that are an integral part of said arms and are located at the respective ends thereof, are inserted into the depressions 5 up to the respective flanges 7. The arms 9 are fastened, in a very simple and convenient way with widely known means, to the flanges which are provided with appropriate holes 11 in correspondence to the point of attachment in the extensions.

It will now be appreciated that a further advantage is derived from the present invention. It is in relation to the flanges 7 which are the material of the drum assembly which undergo the highest stretching load. The flanges 7 are supported by the peripheral rim 6 that, as described above, is arranged in the front portion of the drum near the loading opening. Therefore, the rim is exactly in the portion sustaining the highest load so that strain on the material is minimized.

Such a strengthening effect is improved if the thickness of the peripheral rim 6 is increased, for instance to a thickness which is twice as much as the wall thickness of the drum.

It will of course be appreciated that these drums may be given any appropriate form to comply with differing space constraints and specific drum volume requirements, and may therefore be made to forms or shapes that differ from the one illustrated here by way of example, without departing from the scope of the present invention.

We claim:

1. A drum for clothes washing machines, said drum comprising a body formed of plastic material, said body comprising an outer cylindrical mantle, a rear plate integral with said cylindrical mantle and closing a rear end of said cylindrical mantle to form an interior space, a front wall with an opening and integral with said cylindrical mantle, said front wall partially closing a front end of said cylindrical mantle, a plurality of bosses integral with said cylindrical mantle at an outside surface of said cylindrical mantle and having holes extending therethrough to said interior space, ribs integral with said cylindrical mantle and axially extending along an inside surface of said cylindrical mantle, said ribs being substantially trapezoidal in shape in a plane perpendicular to a rotational axis of said cylindrical mantle and are formed by depressions on said outside surface of the cylindrical mantle, and prominences integral with said rear plate and radially extending along an inside surface of said rear plate, said prominences formed by recesses on an outside surface of said rear plate, each of said recesses projecting radially from a center of the rear plate toward one of said depressions.

2. The drum according to claim 1, said body further comprising a peripheral rim protruding from the outside surface of the cylindrical mantle, said peripheral rim having a thickness larger than a wall thickness of the cylindrical mantle and extending into said depressions (5) to form substantially trapezoidal plane flanges (7).

3. The drum according to claim 2, wherein said plane flanges (7) are provided with perforations (11) in an outer edge portion.

4. The drum according to claim 3, further comprising a spider journal for supporting said body having a plurality of radial arms (9) in said recesses (12) and extensions (10) extending from said radial arms in said depressions (5).

5. The drum according to claim 4, wherein said extensions (1) terminate at said plane flanges (7) and are connected to said plane flanges through said perforations (11).

6. The drum according to claim 2, further comprising a spider journal for supporting said body having a plurality of radial arms (9) in said recesses (12) and extensions (10) extending from said radial arms in said depressions (5).

7. The drum according to claim 6, wherein said extensions (1) terminate at said plane flanges (7) and are connected to said plane flanges.

8. The drum according to claim 1, said body further comprising a peripheral rim protruding from the outside surface of the cylindrical mantle at an outer front portion of the drum, said peripheral rim having a thickness larger than a wall thickness of the cylindrical mantle and extending into said depressions (5) to form substantially trapezoidal plane flanges (7).

9. The drum according to claim 8, wherein said plane flanges (7) are provided with perforations (11) in an outer edge portion.

10. The drum according to claim 9, further comprising a spider journal for supporting said body having a plurality of radial arms (9) in said recesses (12) and extensions (10) extending from said radial arms in said depressions (5).

11. The drum according to claim 10, wherein said extensions (1) terminate at said plane flanges (7) and are connected to said plane flanges through said perforations (11).

12. The drum according to claim 8, further comprising a spider journal for supporting said body having a plurality of radial arms (9) in said recesses (12) and extensions (10) extending from said radial arms in said depressions (5).

13. Drum according to claim 12, wherein said extensions (1) terminate at said plane flanges (7) and are connected to said plane flanges.

* * * * *

UNITED STATES PATENT AND TRADEMARK OFFICE
CERTIFICATE OF CORRECTION

PATENT NO. : 5,433,091
DATED : July 18, 1995
INVENTOR(S) : Durazzani et al.

It is certified that error appears in the above-indentified patent and that said Letters Patent is hereby corrected as shown below:

On the title page, Item [73], the following information should be inserted with respect to the assignee: --Zanussi Elettrodomestici S.p.A., Pordenone, Italy --.

On the face of the patent, the following information should be inserted with respect to the Attorney, Agent or Firm: --Pearne, Gordon, McCoy & Granger--.

Column 1, line 26, delete "oil" and insert --on--.

Signed and Sealed this

Twenty-third Day of January, 1996

Attest:

BRUCE LEHMAN

*Attesting Officer*   *Commissioner of Patents and Trademarks*